PULSE INVERTING INTERSTAGE NETWORK OF HIGH BAND WIDTH

Filed March 5, 1954

Kenneth M. Rehler Inventor
John Dulchinos
By W. R. Maltby
D. C. Snyder
Attorneys

United States Patent Office 2,853,605

Patented Sept. 23, 1958

2,853,605

PULSE INVERTING INTERSTAGE NETWORK OF HIGH BAND WIDTH

Kenneth M. Rehler, Santa Monica, Calif., and John Dulchinos, Chicopee Falls, Mass., assignors, by mesne assignments, to the United States of America as represented by the Secretary of the Navy Application March 5, 1954, Serial No. 414,529

3 Claims. (Cl. 250—27)

This invention relates to a pulse inverting interstage network.

The object of this invention is to provide a pulse inverting interstage network of high band width.

Another object of this invention is to provide a pulse inverting interstage network capable of passing pulses of negative and positive polarity.

Another object of this invention is to provide a pulse inverting interstage network capable of yielding output pulses of one polarity in response to a mixed input of both negative and positive pulses.

Still another object of this invention is to provide a pulse inverting network capable of yielding output pulses of one polarity in response to input pulses of opposite polarity.

A further object of this invention is to provide a pulse inverting network capable of yielding pulses of a single polarity regardless of the polarity of the input pulses.

A further object of this invention is to provide a circuit for inverting and amplifying high frequency input pulses.

Other objects and many of the attendant advantages of this invention will be readily appreciated as the same becomes better understood by reference to the following detailed description when considered in connection with the accompanying drawings wherein.

Figure 1:
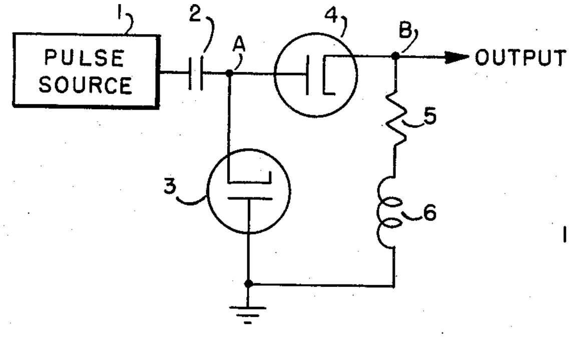
Fig. 1 is a circuit diagram of an inverter comprising one embodiment of my invention.
Figure 1A:
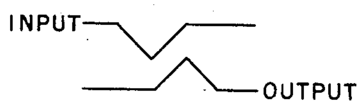
Fig. 1B illustrates the input-output timing of the circuit of Fig. 1.

The pulse inverting network of Fig. 1 comprises a source of pulses 1, coupled by capacitance 2 to oppositely polarized diodes 3 and 4. Pulse source 1 may have an output consisting of negative pulses only or an output of both negative and positive pulses. Diode 3 has its plate connected to ground, and diode 4 has its cathode connected to ground through resistor 5 and inductance 6. This circuit is designed to invert input negative pulses derived from pulse source 1 and to produce output positive pulses at point B. The operation of this circuit with respect to negative pulses is as follows:

A negative pulse obtained from pulse source 1 is applied by coupling capacitor 2 to the circuit. Point A is clamped to ground potential through the low conduction resistance of diode 3, diode 3 being normally nonconducting. The input pulse charges the capacitor during its leading edge resulting in a polarity thereon as shown in Fig. 1. When the negative pulse returns to the base line, diode 3 unclamps and thereupon becomes a nonconducting high impedance. Point A thus rises positive, since it follows the input pulse in its return to the base line. This positive rise at point A connects resistance 5 and inductance 6 to the capacitor 2 through the diode 4 which conducts due to the rising potential at point A. The result is that capacitor 2 and inductance 6 resonate and produce a positive pulse at point B. This positive output pulse is the first half cycle of the L–C resonant frequency. Because of this oscillatory nature of an L–C combination, further positive and negative oscillations would be produced if they were not suppressed. However, only the first positive half cycle appears at the output since the start of the next negative half cycle converts diodes 3 and 4 into low conducting impedances which shunt the inductance 6 and damp out all oscillatory energy. The function of resistance 5 is to increase the rate of change of flux in the inductance 6 and decrease the time constant of damping after the positive output pulse. This results in better band width and less sensitivity to input pulse duty cycle. Capacitor 2 is charged during the leading edge of the negative input pulse and the positive output pulse is initiated by the trailing edge of the input pulse. The input-output timing is as shown in Fig. 1A.

The inverter of Fig. 1, while capable of inverting negative pulses to positive output pulses, has the further advantage of passing positive pulses without inverting or delaying said pulses. When a positive pulse is applied to the circuit through coupling capacitor 2, diode 4 immediately conducts and point B, previously at ground potential, thereby exhibits a rise in potential. The result is a positive output pulse.

Figure 2:
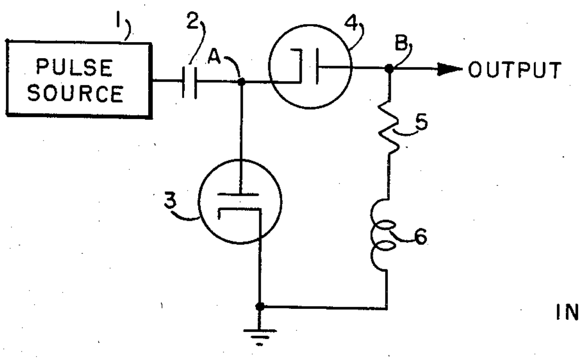
Fig. 2 is a circuit diagram of an inverter comprising a second embodiment of my invention.
Figure 2A:
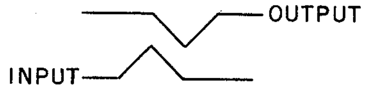
Fig. 2A illustrates the input-output timing of the circuit of Fig. 2.

The circuit of Fig. 2 is a modification of the circuit of Fig. 1 and is specifically designed to invert a positive input pulse to a negative output pulse. Pulse source 1 may have an output consisting of positive pulses only or an output of both positive and negative pulses. In this case, a positive pulse applied to the circuit through coupling condenser 2 drives the plate of diode 3 positive, whereupon diode 3 conducts and clamps point A to ground potential. As the trailing edge of the positive input pulse passes, the cathode to diode 4 drops in potential. As a result, diode 3 becomes a high impedance nonconducting path and diode 4 becomes a low impedance conducting path. The output is taken from point B. Due to the fact that diode 4 becomes conductive only when the trailing edge of the input positive pulse is acting upon it, the negative output pulse derived at point B trails the input pulse as shown in Fig. 2A. As is the case with the circuit of Fig. 1, the circuit of Fig. 2 is capable of inverting pulses of one polarity and passing pulses of the opposite polarity without inversion. Consequently, a negative output pulse is provided in response to a negative input pulse.

Figure 3:
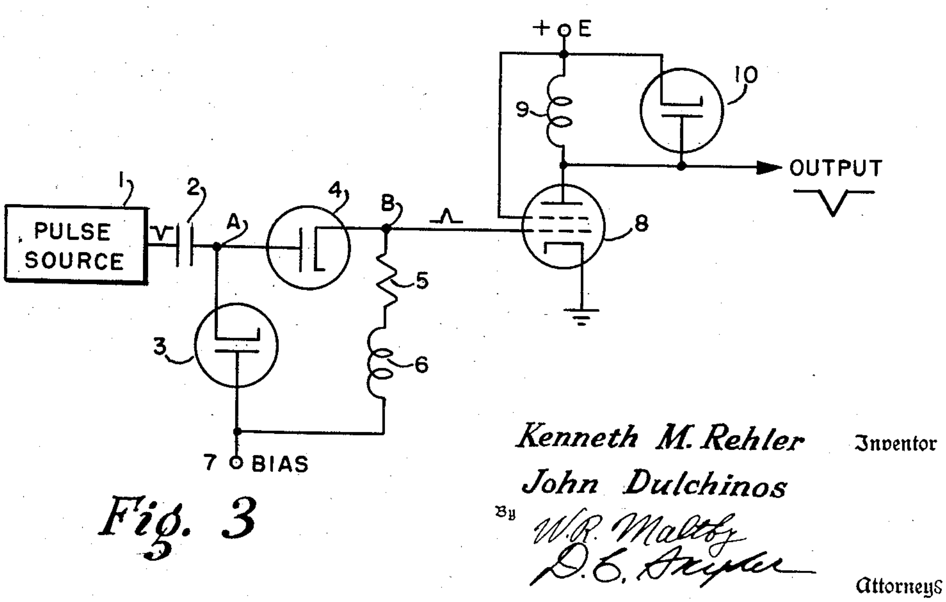
Fig. 3 is a circuit diagram of the inverter of Fig. 1 having its output coupled to an amplifier.

In Fig. 3 is shown a practical application of the circuit of Fig. 1. The positive output derived at point B in the circuit of Fig. 1 is applied to the grid of amplifier tube 8. Amplifier tube 8 has its plate connected to positive potential E and its cathode connected to ground. An inductance 9 is employed in place of a resistor to connect the plate to the source of positive potential E. A diode 10 is connected between source E and the plate of amplifier tube 8. The cathode of diode 10 is connected to source E and the plate of diode 10 is connected to the plate of amplifier tube 8. The positive pulse derived from point B and applied to the grid of amplifier tube 8 produces a negative output pulse at the plate of tube 8. It should be noted that diode 3 is biased at 7 to render it nonconductive in the absence of a negative input. Upon the application of the negative input, diode 3 conducts in the manner described in connection with the description of Fig. 1.

The inductance 9 connected in the plate circuit of amplifier tube 8 serves to improve amplification in the high frequency range of four megacycles in which the amplifier is designed to operate, the low D. C. resistance of the coil in the plate circuit enabling the tube to operate at a higher plate voltage. Diode 10 helps to prevent variations in the output due to a possible ringing in the circuit comprising the inductance of coil 9 and the distributed capacitance between the turns of that same coil. If the plate of the amplifier tends to go positive with respect to the positive voltage source to which it is connected due to the energy stored in the inductance 9, the diode element 10 immediately conducts since its plate is rendered positive with respect to its cathode, and thereby provides a low impedance path for the energy flowing from the inductance. Thus, any tendency of the inductance to cause positive ripples in the output is quickly eliminated.

Tests conducted on the circuit of Fig. 3 indicated that a negative input pulse of 0.13 microsecond base opening and 7 volts amplitude yielded an output pulse of about 20 volts in amplitude. Depending upon the specific circuit constants, the output pulse at the tube plate was equal or wider in base opening. If this negative 20-volt pulse is used to drive a second inverting network, the output of the second amplifier tube will exceed 30 volts. The frequency response of the circuit of Fig. 3 is such that pulse trains at a 4-megacycle pulse repetition rate may be passed. For lower pulse rates, diode 4 may be eliminated. This will allow a small negative pulse to appear at point B ahead of the main output. If desired, a negative bleed may be added to the circuit between capacitor 2 and diode 3 to aid in restoring the capacitor 2 and to thus improve the circuit band width.

It is clear from the above description that the pulse inverting interstage network of this invention has the advantage of being capable of replacing an inverting tube, provides excellent gain for high frequency pulses, is insensitive to a wide range of input pulse duty cycles, uses commercial elements, is capable of passing input pulses of either polarity, and is particularly useful in connection with digital computers.

Obviously many modifications and variatons of the present invention are possible in the light of the above teaching. It is, therefore, to be understood that within the scope of the appended claims the invention may be practiced otherwise than as specifically described.

We claim:

1. A pulse inverting circuit comprising, in combination, a source of voltage pulses, a storage capacitor, one of the terminals of said source of pulses being connected to a reference potential and the other to one side of said storage capacitor, a first diode, said first diode being connected between the other side of said storage capacitor and said reference potential, said diode being so poled with respect to said source of pulses that conduction therein commences whenever the voltage pulse wave form departs from a base line value and continues so long as said wave form increases in amplitude, a second diode, a resistance, an inductance, said second diode, resistance and inductance being connected in that order in series across said first diode, said second diode, resistance and inductance being the only elements connected across said first diode, said second diode being oppositely poled from said first diode with respect to said source of pulses so that conduction therein commences whenever the voltage pulse wave form decreases from a previous peak value and continues so long as said wave form decreases in amplitude, the conduction of said second diode establishing a discharge path for said storage capacitor which includes said inductance whereby said capacitor and said inductance resonate to produce a half cycle wave form across said resistance and said inductance.

2. A pulse inverting circuit as set forth in claim 1 wherein the cathode of said first diode and the anode of said second diode are connected to the storage capacitor.

3. A pulse inverting circuit as set forth in claim 1 wherein the anode of said first diode and the cathode of said second diode are connected to the storage capacitor.

References Cited in the file of this patent

UNITED STATES PATENTS

| | | |
|---|---|---|
| 2,432,204 | Miller | Dec. 9, 1947 |
| 2,444,455 | Labin et al. | July 6, 1948 |
| 2,537,589 | Johnson | Jan. 9, 1951 |
| 2,588,413 | Roschke | Mar. 11, 1952 |
| 2,632,810 | Nyman | Mar. 24, 1953 |